United States Patent [19]

Ulyanov

[11] 3,883,799

[45] May 13, 1975

[54] METHOD FOR STABILIZING CONDUCTANCE OF CONVERSION OF MECHANICAL DISPLACEMENTS INTO ELECTRIC SIGNAL OF CAPACITANCE TRANSDUCER AND DEVICE FOR EFFECTING SAME

[76] Inventor: Lev Petrovich Ulyanov, Eropkinsky pereulok, 7, kv. 6, Moscow, U.S.S.R.

[22] Filed: Dec. 28, 1973

[21] Appl. No.: 429,398

[30] Foreign Application Priority Data
Dec. 29, 1972  U.S.S.R. ............................ 1860251
Dec. 29, 1972  U.S.S.R. ............................ 1860252

[52] U.S. Cl. ............... 324/61 R; 318/662; 323/75 J; 323/93
[51] Int. Cl. ............................................... G01r 27/26
[58] Field of Search ............ 324/61 R; 323/75 J, 93; 318/662

[56] References Cited
UNITED STATES PATENTS
| | | | |
|---|---|---|---|
| 2,623,996 | 12/1952 | Gray | 324/61 R X |
| 3,639,832 | 2/1972 | Goebbels | 323/75 J X |
| 3,657,630 | 4/1972 | Fiet | 318/662 X |

*Primary Examiner*—Stanley T. Krawczewicz
*Attorney, Agent, or Firm*—Holman & Stern

[57] ABSTRACT

A method for stabilizing the conductance of conversion of mechanical displacements into an electric signal of a capacitance transducer incorporated into a bridge circuit consists, according to the invention, in controlling the supply voltage of the capacitance transducer and thus keeping constant the total current of two capacitors of the capacitance transducer, which is being measured continuously.

A device for effecting the proposed method comprises two measuring current transformers whose primary windings, together with the series-connected capacitors of the capacitance transducer, make up two arms of a measuring bridge, the other two arms of that bridge being made up by resistors; a capacitor connected to the diagonal of the measuring bridge; a second capacitor connected to the circuit of series-connected secondary windings of the two measuring current transformers; an alternating voltage amplifier connected to the second capacitor; a demodulator connected to the alternating voltage amplifier; a stabilized direct-current voltage source and a comparator, the latter being connected to the demodulator and the stabilized direct-current voltage source and, via a direct-current voltage amplifier, to a servomotor which is mechanically coupled, via a reduction gear, to an output voltage regulator of a harmonic oscillator.

2 Claims, 5 Drawing Figures

METHOD FOR STABILIZING CONDUCTANCE OF CONVERSION OF MECHANICAL DISPLACEMENTS INTO ELECTRIC SIGNAL OF CAPACITANCE TRANSDUCER AND DEVICE FOR EFFECTING SAME

The present invention relates to the field of measuring mechanical values such as deformations of structures and angular or linear displacements of structures with the aid of a capacitance transducer connected to a bridge circuit, and more particularly, to a method for stabilizing the conductance of conversion of mechanical displacements into an electric signal of a capacitance transducer and a device for effecting same.

Known at present is a method for stabilizing the conductance of conversion of mechanical displacements into an electric signal of a capacitance transducer.

The known method aims at excluding the effects of the temperature and humidity of the surrounding medium, as well as the effects of instability of the supply voltage of the power source of the bridge circuit upon the operation of the capacitance transducer, for which purpose said transducer is sealed off and placed in a thermostat, and special care is taken to stabilize the supply voltage of the capacitance transducer.

A disadvantage of the known method lies in that it is too complicated and costly.

Also known at present is a device for effecting the foregoing method for stabilizing the conductance of conversion of mechanical displacements into an electric signal of a capacitance transducer.

The known device comprises a sealed-off chamber, a thermostat and a supply voltage regulator of the capacitance transducer.

Disadvantages of the known device reside in complications involved in the sealing off and thermal insulation of the capacitance transducer, in the necessity to design special sealed-off chambers and thermostats for each individual type of capacitance transducer, and in great stresses and moments evolving in stuffing-box seals of the sealing-off means. The above disadvantages and a considerable cost of the device are the major reason for the limited use of capacitance transducers as converters of mechanical displacements into an electric signal.

It is an object of the present invention to provide a universal and simple method for stabilizing the conductance of conversion of mechanical displacements into an electric signal of a capacitance transducer connected to a bridge circuit, regardless of the specific features of its structure and purpose, and a device for effecting the foregoing method, which would be less expensive and simpler to manufacture than the known device.

According to the invention, the proposed method for stabilizing the conductance of conversion of mechanical displacements into an electric signal of a capacitance transducer essentially consists in shunting the output of the capacitance transducer, continuously measuring the total current of the two capacitors of the capacitance transducer, controlling the supply voltage of the capacitance transducer, and stabilizing the total current being measured of the two capacitors of the capacitance transducer.

The object of the present invention is also attained by that the device for effecting the proposed method for stabilizing the conductance of conversion of mechanical displacements into an electric signal of a capacitance transducer, the device incorporating a harmonic oscillator and an output voltage regulator of the harmonic oscillator, comprises, in accordance with the invention, a measuring current transformer, one lead of the primary winding thereof being connected to one terminal of the output voltage regulator, a second measuring current transformer, one lead of the primary winding thereof being connected to another terminal of the output voltage regulator, second leads of the primary windings of the measuring current transformers being connected to two output terminals of the device, connected in series to each of the latter being one of the capacitors of a capacitance transducer, the primary windings of the measuring current transformers, together with the series-connected capacitors of the capacitance transducer making up two adjacent arms of a measuring bridge, two other arms of the measuring bridge being made up by resistors, the device also comprising a capacitor connected to the diagonal of the measuring bridge, one lead of the capacitor being a third output terminal of the device, a second capacitor connected to the circuit of series-connected secondary windings of the two measuring current transformers, an alternating voltage amplifier, whose input is connected to the second capacitor, a demodulator connected to the output of the alternating voltage amplifier, a stabilized direct-current voltage source and a comparator, the latter being connected to the demodulator and to the output of the stabilized direct-current voltage source, a servomotor, a direct-current voltage amplifier connected to the output of the comparator and to the servomotor which is mechanically coupled via a reduction gear to the output voltage regulator whose output is connected to the input of the harmonic oscillator.

The use of the proposed method for stabilizing the conductance of conversion of mechanical displacements into an electric signal of a capacitance transducer and of the proposed device for effecting same makes unnecessary labor-consuming and costly operations, as well as the sealing and thermal insulation means for capacitance transducers, expanding thereby the field of application for capacitance transducers and making it possible to produce quick-response capacitance transducers with a high resolving power and a high linearity of conversion of mechanical displacements and deformations of structures into an electric signal.

The present invention will hereinafter be explained in greater detail with reference to a specific embodiment thereof taken in conjunction with the accompanying drawings, wherein.

Figure 1:
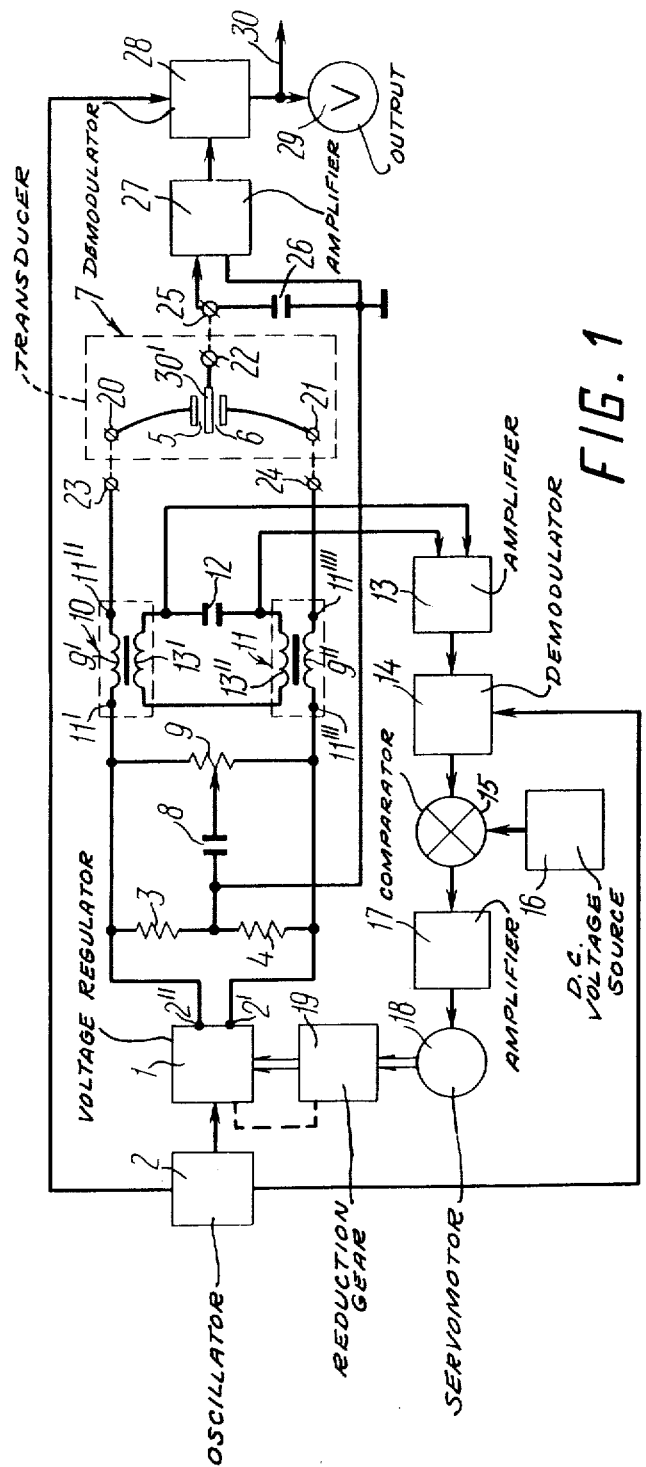
FIG. 1 is a block diagram of a device for effecting the proposed method for stabilizing the conductance of conversion of mechanical displacements into an electric signal of a capacitance transducer, in accordance with the invention.

Consider now the proposed method for stabilizing the conductance of conversion of mechanical displacements into an electric signal of a capacitance transducer connected to the circuit of a measuring bridge.

The output of the capacitance transducer is shunted, which ensures operating conditions close to those of a short circuit.

In the case of a pre-balanced measuring bridge operating in the short-circuit conditions, when the impedance of the capacitors of the capacitance transducer is substantially greater than the stable impedances of the two other arms of the measuring bridge and the load, the output current of the measuring bridge, i.e., the short-circuit current, is proportional to the supply voltage of the measuring bridge and to the value of the imbalance of the measuring bridge, which, in turn, is proportional to the change in the capacity of the capacitors of the capacitance transducer.

Continuous measurement is made of the total current of the two capacitors of the capacitance transducer.

The total current of the two capacitors of the capacitance transducer, flowing through the capacitors of the capacitance transducer, is proportional, to an accuracy of values of the higher order of smallness, to the supply voltage of the capacitance transducer and the total capacity of the capacitors of the capacitance transducer and is independent of changes in the ratio between the values of the capacitors of the capacitance transducer.

Therefore, stabilization of the total current flowing through the capacitors of the capacitance transducer, effected by way of controlling the supply voltage of the capacitance transducer, makes the output voltage of the measuring bridge independent of a change in the total capacity of the capacitors of the capacitance transducer, which may occur as a result of a change in the humidity or the temperature of the surrounding medium; voltage stabilization of the power source of the capacitance transducer is also ruled out.

The short-circuit operating conditions make the output current of the measuring bridge independent of a change in the output impedance of the measuring bridge and of the input impedance of the alternating voltage amplifier.

Consider now the proposed device for effecting the foregoing method for stabilizing the conductance of conversion of mechanical displacements into an electric signal of a capacitance transducer.

Referring to the accompanying drawings, the proposed device for effecting the foregoing method for stabilizing the conductance of conversion of mechanical displacements into an electric signal of a capacitance transducer comprises an output voltage regulator 1 (FIG. 1) of a harmonic oscillator 2, having terminals 2′ and 2″ and connected to a measuring bridge made up by resistors 3 and 4 and capacitors 5 and 6 of a capacitance transducer 7 with a capacitor 8, connected to the measuring bridge, and a potentiometer 9. Connected in series to each of the capacitors 5 and 6 of the capacitance transducer 7 is one of two primary windings 9′ and 9″ of measuring current transformers 10 and 11, the primary winding 9′ of the current transformer 10 having leads 11′ and 11″, and the primary winding 9″ of the transformer 11 having leads 11′″ and 11″″. The primary winding 9′ and the series-connected capacitor 5 make up an arm of the measuring bridge, whereas the primary winding 9″ and the series-connected capacitor 6 make up a second arm of the measuring bridge, adjacent to the first arm. Two other arms of the measuring bridge are made up by the resistors 3 and 4.

A capacitor 12 connected to an alternating voltage amplifier 13 and secondary windings 13′ and 13″ of the current transformers 10 and 11, respectively, are connected in series.

The alternating voltage amplifier 13 is connected via a demodulator 14 to a comparator 15 which is also connected to a stabilized direct-current voltage source 16.

The comparator 15 is connected via a direct-current voltage amplifier 17 to a servomotor 18 which is mechanically coupled via a reduction gear 19 to the output voltage regulator 1 of the harmonic oscillator 2.

The capacitance transducer 7, having terminals 20, 21 and 22, is connected via these terminals 20, 21 and 22 to output terminals 23 and 24 and an output terminal 25, respectively, the latter terminal being a lead of a capacitor 26 connected to the diagonal of the measuring bridge.

The capacitor 26 is also connected to an amplifier 27 which is connected via a demodulator 28 to a voltmeter 29. The demodulator 28 has an output 29, the voltage across which is proportional to the displacement of a movable strip 30′ of the capacitance transducer 7. The demodulators 14 and 28 are also connected to the harmonic oscillator 2.

An input 31 (FIG. 2) of the regulator 1 is connected to the harmonic oscillator 2 (FIG. 1).

A separating capacitor 32 (FIG. 2) is connected to the input 31 of the regulator 1 and to the base of a transistor 33.

The base of the transistor 33 is connected to a voltage divider made up by resistors 34 and 35. Connected to the emitter circuit of the transistor 33 is a feedback resistor 36. Connected to a load resistor 37 of the transistor 33 is the base of a transistor 38.

Connected to the collector circuit of the transistor 38 is a load resistor 39 which is also connected to the base of a transistor 40. A resistor 41 and a stabilitron 42, both being connected to the emitter circuit of the transistor 38, make up a bias circuit of the transistor 38.

Figure 2:
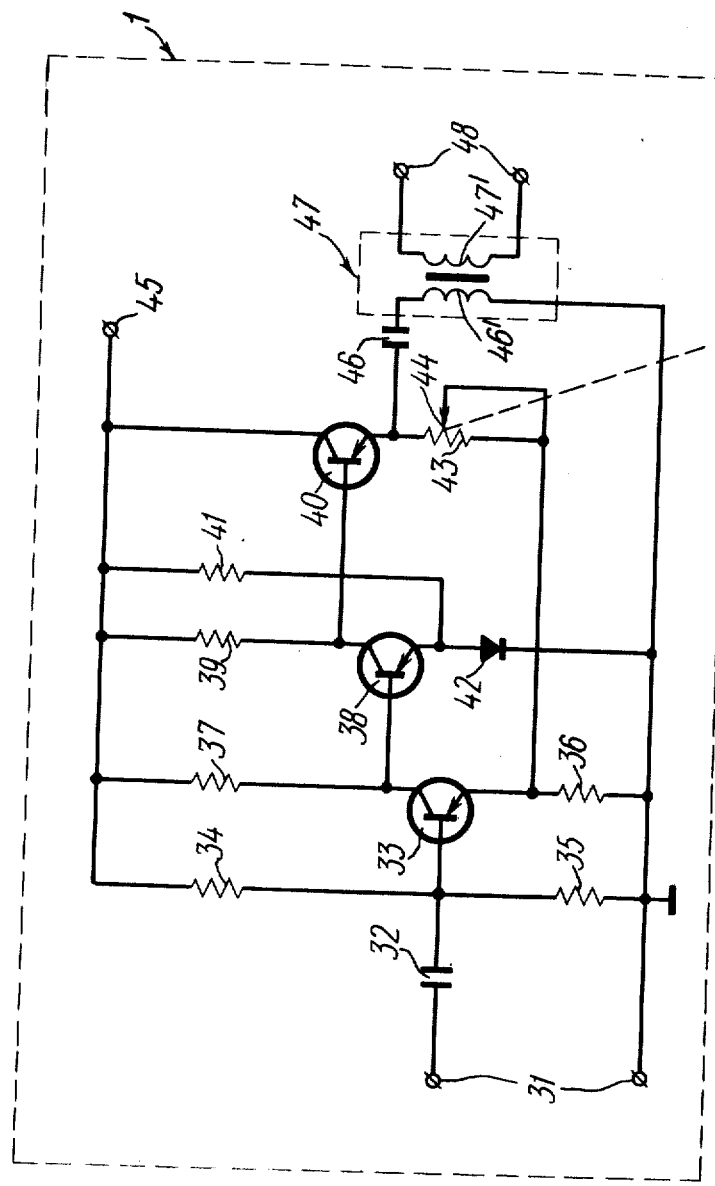
FIG. 2 is a key diagram of an output voltage regulator of a harmonic oscillator, in accordance with the invention.

Connected to the emitter circuits of the transistors 40 and 33 is a variable resistor 43 whose cursor 44 is mechanically coupled to the reduction gear 19 (FIG. 1), said coupling being shown with a dotted line. The variable resistor 43 is a load resistor of the transistor 40 (FIG. 2).

The collector of the transistor 40 and the resistors 34, 37, 39 and 41 are connected to a terminal 45, connected whereto is a direct-current voltage source (not shown).

Connected to the emitter circuit of the transducer 40 via a separating capacitor 46 is a primary winding 46′ of a transformer 47 whose secondary winding 47′ is connected with the aid of terminals 48 to the resistors 3 and 4 (FIG. 1), the potentiometer 9 and the primary windings 9′ and 9″ of the current transformers 10 and 11.

Figure 3:
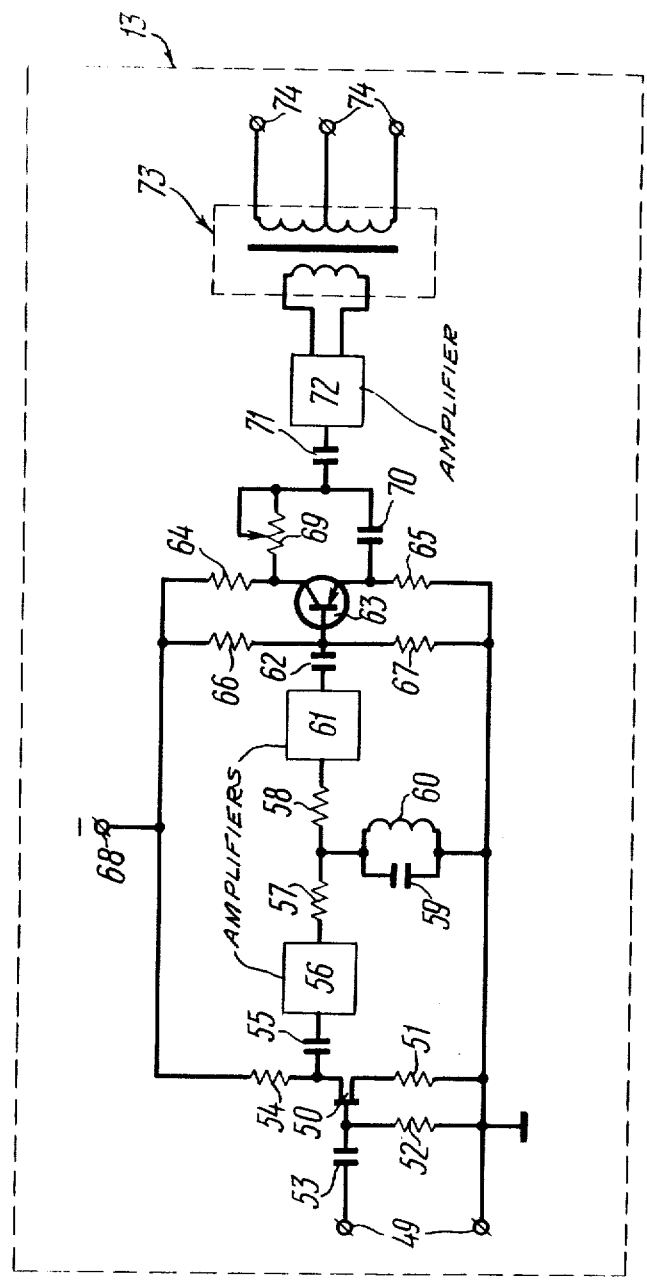
FIG. 3 is a key diagram of an alternating voltage amplifier, in accordance with the invention.

Connected to the capacitor 12, which is connected in series to the secondary windings 13′ and 13″ of the current transformers 10 and 11, is an input 49 (FIG. 3) of the alternating voltage amplifier 13.

The input stage of the alternating voltage amplifier 13 is built around a field-effect transistor 50, connected whereto are an automatic bias resistor 51, a leakage resistor 52, a separating capacitor 53 and a load resistor 54. The load resistor 54 is connected via a separating capacitor 55 to an alternating voltage amplifier 56.

The alternating voltage amplifier 56 is connected via a selective circuit incorporating series-connected resistors 57 and 58 and a capacitor 59 and an inductance coil 60, the latter two being connected in parallel, to an alternating voltage amplifier 61.

Connected to the output of the alternating voltage amplifier 61 via a separating capacitor 62 is a phase-shifting stage built around a transistor 63 with two load resistors 64 and 65. The base of the transistor 63 is connected to a voltage divider made up by resistors 66 and 67.

Connected to a terminal 68 is the negative terminal of a power source (the power source not shown).

Connected to the load resistors 64 and 65 are a variable resistor 69 and a capacitor 70, respectively, the latter two being connected in series and also being connected via a separating capacitor 71 to an alternating voltage amplifier 72. The resistor 69 and the capacitor 70 make up a phase-shifting circuit.

Connected to an output of the alternating voltage amplifier 72 is a transformer 73 with output terminals 74.

The alternating voltage amplifier 27 (FIG. 1) is identical with the alternating voltage amplifier 13.

Figure 4:
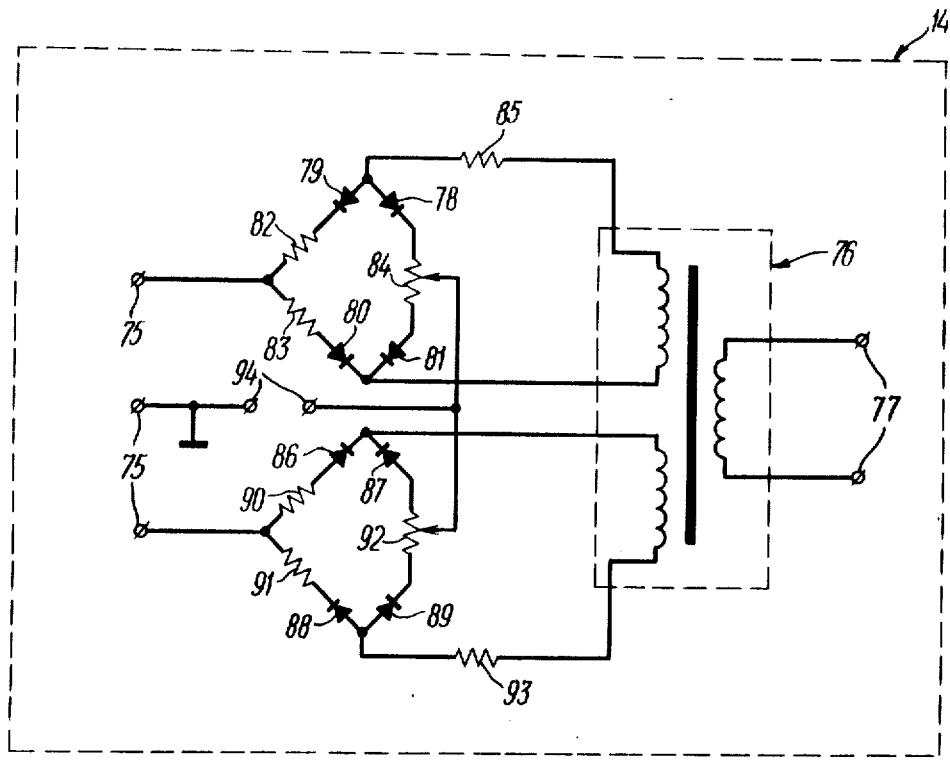
FIG. 4 is a key diagram of a demodulator, in accordance with the invention.

Connected to the output terminals 74 (FIG. 3) are input terminals 75 (FIG. 4) of the demodulator 14.

The demodulator 14 comprises two identical four-arm diode bridges and a transformer 76 connected to terminals 77 and the harmonic oscillator 2 (FIG. 1).

One four-arm bridge (FIG. 4), made up of diodes 78, 79, 80 and 81, two resistors 82 and 83 and a potentiometer 84, is connected to the transformer 76 via a ballast resistor 85.

The other four-arm bridge, made up of diodes 86, 87, 88 and 89, resistors 90 and 91 and a potentiometer 92, is connected to the transformer 76 via a ballast resistor 93.

An output 94 of the demodulator 14 is connected to the comparator 15 (FIG. 1).

The demodulator 28 is identical with the demodulator 14.

Figure 5:
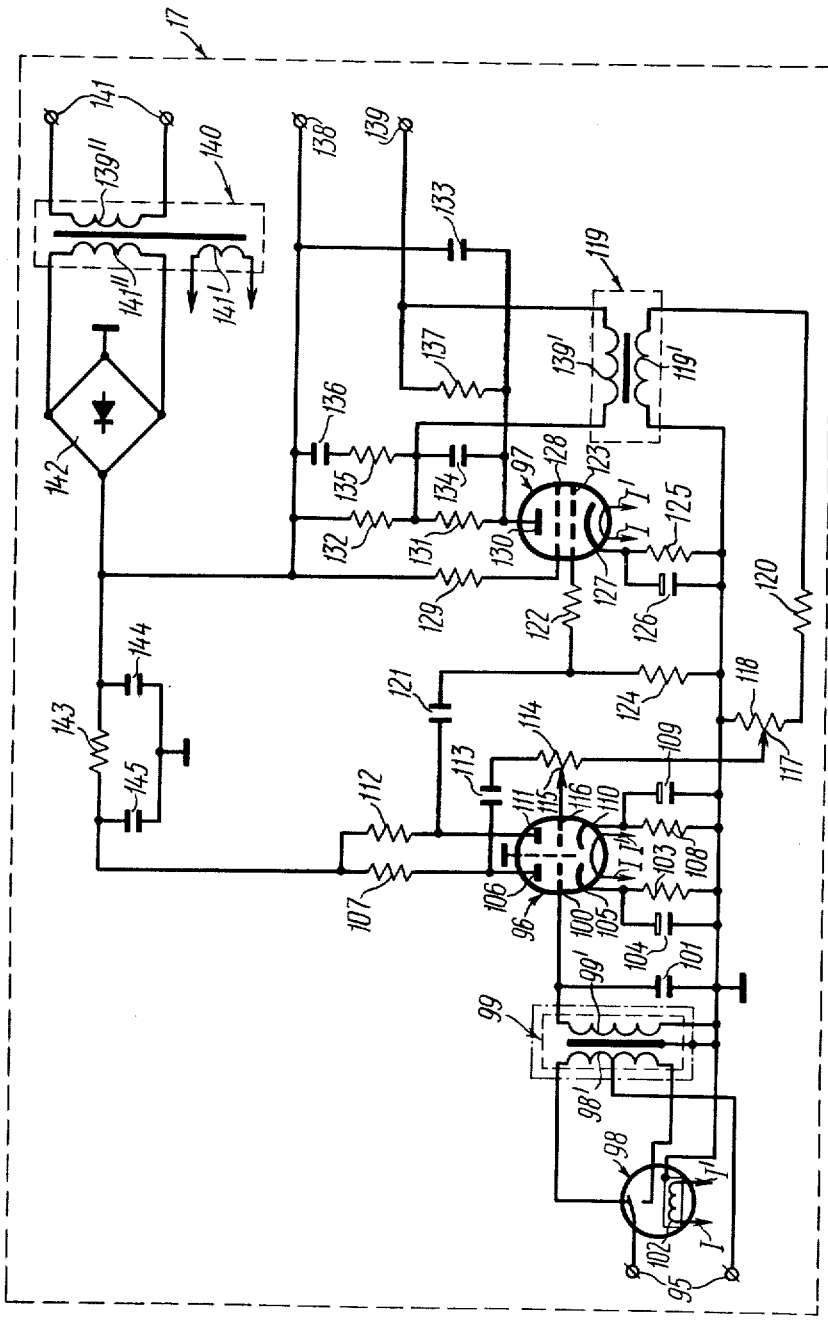
FIG. 5 is a key diagram of a direct-current voltage amplifier, in accordance with the invention.

The comparator 15 is built around resistors and connected to an input 95 (FIG. 5) of the direct-current voltage amplifier 17.

The direct-current voltage amplifier 17 is built around a double triode 96 and an output beam tetrode 97 with modulation of input direct-current voltage at the commercial frequency. Built around the double triode 96 are the first two voltage amplifier stages; built around the output beam tetrode 97 is a power amplifier.

Modulation of input direct-current voltage is effected with the aid of a vibropack 98.

Connected to the input 95 of the direct-current voltage amplifier 17 are the vibropack 98 and the central point of a primary winding 98' of a transformer 99.

The primary winding 98' of the transformer 99 is connected to the vibropack 98; a secondary winding 99' of the transformer 99 is connected to a grid 100 of the double diode 96.

Connected to the secondary winding 99' of the transformer 99 is a capacitor 101 which makes up, with the secondary winding 99' of the transformer 99, a resonant oscillatory circuit tuned to the commercial frequency.

A coil 102 of the vibropack 98 and the transformer 99 are screened.

A resistor 103 and a capacitor 104, both being connected to a cathode 105 of the double triode 96, make up an automatic bias circuit of the first amplifier stage.

Connected to a plate 106 of the double triode 96 is a load resistor 107 of the first amplifier stage.

A resistor 108 and a capacitor 109, both being connected to a cathode 110 of the double triode 96, make up an automatic bias circuit of the second amplifier stage.

Connected to a plate 111 of the double triode 96 is a load resistor 112 of the second amplifier stage.

The plate 106 of the double triode 96 is connected via a separating capacitor 113 to a potentiometer 114 whose cursor 115 is connected to a grid 116 of the double triode 96.

The potentiometer 114 performs the function of a voltage divider with a variable division coefficient, i.e., it plays the role of an amplification factor regulator of the direct-current voltage amplifier 17.

The potentiometer 114 is also connected to a cursor 117 of a potentiometer 118.

A transformer 119, a secondary winding 119' thereof being connected via a resistor 120 to the potentiometer 118, the resistor 120 and the potentiometer 118 make up a transient negative feedback circuit of the direct-current amplifier 17.

The potentiometer 118 is meant to regulate the feedback amount of the direct-current voltage amplifier 17.

The plate 111 of the double triode 96 is connected via a separating capacitor 121 and a limit resistor 122 to a grid 123 and via the separating capacitor 121 to a leakage resistor 124 of the output beam tetrode 97.

A resistor 125 and a capacitor 126, both being connected to a cathode 127 of the output beam tetrode 97, make up an automatic bias circuit of the power amplifier.

Connected to a grid 128 of the output beam tetrode 97 is a limit resistor 129.

Connected to a plate 130 of the beam tetrode 97 are series-connected resistors 131 and 132.

The series-connected resistors 131 and 132 are shunted by a capacitor 133.

The resistor 131 is shunted by a capacitor 134.

The resistor 132 is shunted by a resistor 135 and a capacitor 136, the latter two being connected in series.

The resistor 131, connected whereto is the capacitor 134, and the resistor 132, connected whereto are the resistor 135 and the capacitor 136, make up two arms of a tachometer bridge. The tachometer bridge is a device make up of the resistors 131, 132 and 135, the capacitors 134 and 136 and the control winding of the servomotor 18 (FIG. 1), the voltage across the output of the tachometer bridge being proportional to the speed of rotation of the servomotor 18. The control winding of the servomotor 18 is not shown in the drawings.

A resistor 137 and the control winding of the servomotor 18 are connected to output terminals 138 and 139 (FIG. 5) of the direct-current voltage amplifier 17 and make up two other arms of the tachometer bridge.

Connected to the diagonal of the tachometer bridge is a primary winding 139' of the transformer 119.

A primary winding 139" of a transformer 140 is connected with the aid of terminals 141 to alternating-current mains terminals (the latter terminals not shown).

A secondary winding 141' of the transformer 140 is connected to filament circuits l and l' of the double triode 96 and of the output beam tetrode 97 and to the coil 102 of the vibropack 98.

Another secondary winding 141" of the transformer 140 is connected to a rectifier bridge 142.

The rectifier bridge 142 is connected via a filter made up by a resistor 143 and capacitors 144 and 145 to the load resistors 107 and 112 of the first and second voltage amplifier stages of the double triode 96, respectively.

The rectifier bridge 142 is also connected to the resistors 129 and 132, the capacitors 136 and 133 and the output terminal 138 of the direct-current voltage amplifier 17.

The servomotor 18 (FIG. 1) is mechanically coupled via the reduction gear 19 to the cursor 44 (FIG. 2) of the variable resistor 43.

The proposed device makes it possible to effect the proposed method for stabilizing the conductance of conversion of mechanical displacements into an electric signal of a capacitance transducer.

Values being measured, such as deformations of structures or displacements of structures, act upon the movable strip 30' of the capacitors 5 and 6 (FIG. 1) of the capacitance transducer 7, which changes the ratio between the values of the capacity of the capacitors 5 and 6 of the capacitance transducer 7. The voltage across the output terminal 25 is proportional to a change in the values of the capacity of the capacitors 5 and 6 and, consequently, is proportional to the deformation (displacement) of the structure, which is being measured.

The above-mentioned voltage is amplified by the amplifier 27, rectified by the demodulator 28 and measured by the voltmeter 29 graduated in values being measured.

A change in the temperature and/or humidity of the surrounding medium results in a change in the total capacity of the capacitors 5 and 6 of the capacitance transducer 7 and, consequently, in a change in the total current flowing through the capacitors 5 and 6 and in the output voltage of the capacitance transducer 7.

The total current and the output voltage of the capacitance transducer 7 may be changed by changing the supply voltage of the capacitance transducer 7. At the same time, a deformation of the movable strip 30' of the capacitance transducer 7 leads to a change in the ratio of the values of the capacitors 5 and 6 without changing their total capacity and, consequently, without changing the total current flowing through the capacitors 5 and 6. Since the conversion conductance of the capacitance transducer 7 is proportional to the total current through the capacitors 5 and 6, stabilization of said total current by way of controlling the supply voltage of the capacitance transducer 7 makes indications of the capacitance transducer 7 independent of external influences.

The device for effecting the proposed method for stabilizing the conductance of conversion of mechanical displacements into an electric signal of a capacitance transducer operates as follows.

The measuring bridge made up of the resistors 3 and 4, the primary windings 9' and 9" of the current transformers 10 and 11 and the capacitors 5 and 6 of the capacitance transducer 7, with the capacitor 8 and the potentiometer 9 being connected to said measuring bridge, is energized via the output voltage regulator 1 of the harmonic oscillator 2; initially said bridge is balanced, with no voltage across the capacitor 26.

A deformation of the movable strip 30' of the capacitance transducer 7 results in a voltage across the capacitor 26, said voltage being proportional to said deformation; as this takes place, the current flowing through the capacitors 5 and 6 of the capacitance transducer 7 is transformed to the secondary windings 13' and 13" of the current transformers 10 and 11 so that voltage across the capacitor 12 is proportional to the total current through the capacitors 5 and 6 of the capacitance transducer 7.

From the capacitor 12, this voltage is applied to the input 49 (FIG. 3) of the alternating voltage amplifier 13.

The first stage of the alternating voltage amplifier 13 has a high-resistance input and is built around the field-effect transistor 50. The alternating voltage is applied from the load resistance 54 via the separating capacitor 55 to the alternating-current amplifier 56, is amplified by the latter, filtered with the aid of the selective circuit including the capacitor 59 of the inductance coil 60, which are shunted by the resistors 57 and 58 in order to stabilize the characteristics of the selective circuit, and is then applied to the alternating-current amplifier 61. The voltage amplified by the alternating-current amplifier 61 is applied via the separating capacitor 62 to the base of the transistor 63, built around which is the phase-shifting stage. The capacitor 70 connected to the load resistor 65 and the variable resistor 69 connected to the load resistor 64 make up a phase-shifting circuit.

From the phase-shifting stage, the alternating voltage is applied via the separating capacitor 71 to the alternating-current amplifier connected to the output transformer 73 having the output 74.

The output 74 of the alternating voltage amplifier 13 is connected to the input 75 (FIG. 4) of the demodulator 14.

The variable resistor 69 (FIG. 3) sets the phase of the voltage across the output 74 of the alternating voltage amplifier 13, which phase is identical with that of the reference voltage applied to the input 77 (FIG. 4) of the demodulator 14 from the harmonic oscillator 2 (FIG. 1) which also energizes the demodulator 28.

The voltage applied to the input 77 (FIG. 4) of the demodulator 14 is transformed by the transformer 76 and is applied via the ballast resistors 85 and 93 to the two four-arm diode bridges which perform the function of diode switches.

If, for example, the four-arm diode bridge, including the diodes 78, 79, 80 and 81, the resistors 82 and 83 and the potentiometer 84, is conducting at a given moment under the action of the reference voltage of the harmonic oscillator 2 (FIG. 1), which means that current is flowing through the ballast resistor 85 (FIG. 4) and said four-arm diode bridge, the other four-arm diode bridge, including the diodes 86, 87, 88 and 89, the resistors 90 and 91 and the potentiometer 92, is not conducting, i.e., there is no current through the load ballast resistor 93.

If under the action of the reference voltage the four-arm diode bridge, including the diodes 78–81, the resistors 82 and 83 and the potentiometer 84 is rendered non-conducting, the other four-arm diode bridge, including the diodes 86–89, the resistors 90 and 91 and the potentiometer 92, at this moment is rendered conducting under the action of the reference voltage.

The alternating voltage applied to the input 75 of the demodulator 14 from the output 74 (FIG. 3) of the alternating voltage amplifier 13 is rectified by the four-arm bridge, so that direct-current voltage appears across the output 94 (FIG. 4) of the demodulator 14.

From the output 94 of the demodulator 14, this direct-current voltage is applied to the comparator 15 (FIG. 1) where it is compared to the voltage of the stabilized direct-current voltage source 16.

The signal of a difference between these voltages is applied from the comparator 15 to the input 95 (FIG. 5) of the direct-current voltage amplifier 17.

With the aid of the vibropack 98 energized with alternating commercial-frequency voltage from the winding 141' of the transformer 140 the input direct-current voltage is converted into alternating commercial-frequency voltage and is applied via the transformer 99 to the grid 100 of the double triode 96.

The filament circuits II' of the double diode 96 and the beam triode 97 are also energized from the winding 141' of the transformer 140.

The transformer 99 and the coil 102 of the vibropack 98 are screened in order to raise the noise immunity of the direct-current voltage amplifier 17.

The oscillatory circuit made up by the inductance of the secondary winding 99' of the transformer 99 and the capacitance of the capacitor 101 is tuned in resonance with the frequency of the power current.

The direct-current voltage amplifier 17 comprises the first amplifier stage, built around one half of the double triode 96, the second amplifier stage, built around the other half of the double triode 96, and a power amplifier built around the beam tetrode 97.

A signal applied to the grid 100 of the double triode 96 is amplified by the first amplifier stage and is then applied from the load resistor 107 via the separating capacitor 113 and the potentiometers 114 and 118 to the grid 116 of the double triode 96.

Amplified by the second amplifier stage, the voltage is applied from the load resistor 112 via the separating capacitor 121, the resistor 124 and the limit resistor 122 to the grid 123 of the beam tetrode 97.

Amplified by the power amplifier, the signal is applied via the arm of the tachometer bridge made up by the resistor 137 to the output terminals 138 and 139 of the direct-current voltage amplifier 17.

The cursor 115 of the potentiometer 114 regulates the amplification factor of the direct-current voltage amplifier 17.

The servomotor 18 (FIG. 1) is connected to the output terminals 138 and 139 of the direct-current voltage amplifier 17.

The power amplifier of the direct-current voltage amplifier 17 (FIG. 5) has a transient negative feedback with the second amplifier stage, the value of said feedback being dependent upon the speed of rotation of the servomotor 18 (FIG. 1). The value of the rate feedback voltage applied to the amplifier stage may be varied with the aid of the potentiometer 118 (FIG. 5) which makes it possible to control the process of damping the entire servosystem.

The tachometer bridge is balanced so as to make the voltage through the windings of the transformer 119 equal to zero with the non-rotating rotor of the servomotor 18 (FIG. 1).

The rotor of the servomotor 18 is not shown in the drawings.

The transformer 119 (FIG. 5) is employed in the output stage of the power amplifier for galvanic direct-current isolation.

The resonance circuit made up by the capacity of the capacitor 133 and the inductance of the control winding of the servomotor 18 (FIG. 1) is tuned to the commercial frequency by the capacitor 133.

Power is supplied to the direct-current amplifier 17 from the transformer 140 (FIG. 5) whose primary winding 139" is connected via the terminals 141 to commercial alternating-current mains.

The voltage of the secondary winding 141" of the transformer 140, rectified by the rectifier bridge 142, energizes the power amplifier built around the beam tetrode 97; the first and second amplifier stages built around the double triode 96 are energized via the filter made up by the resistor 143 and the capacitors 144 and 145.

The filament circuits 118 of the double triode 96 and the beam tetrode 97 are energized from the secondary winging 141' of the transformer 140.

The voltage across the output terminals 138 and 139 is used to control operation of the servomotor 18 (FIG. 1).

The servomotor 18 is mechanically coupled via the reduction gear 19 to the cursor 44 (FIG. 2) of the variable resistor 43 of the output voltage regulator 1 of the harmonic oscillator 2 (FIG. 1).

The output voltage regulator 1 operates in the following manner.

From the harmonic oscillator 2, voltage is applied to the input 31 (FIG. 2) of the output voltage regulator.

The output voltage regulator 1 is a three-stage voltage amplifier with potentiometer inter-stage connections and one common negative current feedback.

The first amplifier stage is built around the transistor 33.

The second amplifier stage is built around the transistor 38.

The third, output stage which is a current amplifier is built around the transistor 40 with a common collector.

The voltage amplification factor of the output voltage regulator 1 is determined by the ratio between the values of the resistances of the resistors 36 and 43 multiplied by the ratio of transformation of the transformer 47.

The value of the resistance of the resistor 43 is proportional to the angle of rotation of the servomotor 18 (FIG. 1), which means that the value of the output voltage of the regulator 1 is the function of the angle of rotation of the servomotor 18.

For example, in the case of an increase in the total current through the capacitors 5 and 6, as compared to a rated value, the servomotor 18 changes the resistance value of the variable resistor 43 so that the output voltage of the regulator 1 and, consequently, the supply voltage of the capacitance transducer 7, decreases, which results in stabilization of the total current through the capacitors 5 and 6 of the capacitance transducer 7.

The proposed method for stabilizing the conductance of conversion of mechanical displacements into an electric signal of a capacitance transducer and the device disclosed herein for effecting said method have been used to produce a quick-response, high-precision capacitance transducer of a rotation angle, which is employed in torsion viscometers.

The new transducer displays better static and dynamic characteristics, as compared to known optical and inductance transducers.

What is claimed is:

1. A method for stabilizing the conductance of conversion of mechanical displacements into an electric signal of a capacitance transducer having two capacitors incorporated into a bridge circuit, consisting in shunting the output of said capacitance transducer, continuously measuring the total current of said two capacitors of said capacitance transducer, controlling the supply voltage of the capacitance transducer and stabilizing said total current, which is being measured, of said two capacitors of said capacitance transducer.

2. A device for effecting the method for stabilizing the conductance of conversion of mechanical displacements into an electric signal of a capacitance transducer, comprising a harmonic oscillator; an input and an output of said harmonic oscillator; an output voltage regulator of said harmonic oscillator; an input and an output of said output voltage regulator; said input of said output voltage regulator being connected to said output of the harmonic oscillator; two terminals of said output voltage regulator; resistors; a measuring current transformer; a primary winding and a secondary winding of said measuring current transformer; two leads of said primary winding of said measuring current transformer; one said lead of said primary winding of said measuring current transformer being connected to one said terminal of said output voltage regulator; a second measuring current transformer; a primary winding and a secondary winding of said second measuring current transformer; two leads of said primary winding of said second measuring current transformer; one said lead of said primary winding of said second current transformer being connected to said other terminal of said output voltage regulator; a circuit made up by series-connected said secondary windings of said two measuring current transformers; two output terminals of the device; one of said output terminals of the device being connected to each of said second leads of said primary windings of said measuring current transformers; one of said capacitors of said capacitance transducer being connected in series to each of said two output terminals of the device; a measuring bridge; a diagonal of the measuring bridge; each of two arms of said measuring bridge being made up by one of said primary windings of said measuring current transformers together with one of said series-connected capacitors of said capacitance transducer; two other arms of said measuring bridge being made up by said resistors; a capacitor connected to said diagonal of said measuring bridge; two leads of said capacitor; one of said leads of said capacitor being a third output terminal of the device; a second capacitor connected to said circuit of said series-connected secondary windings of said two measuring current transformers; an alternating voltage amplifier; an input and an output of said alternating voltage amplifier; said input of said alternating voltage amplifier being connected to said second capacitor; a demodulator connected to said output of said alternating voltage amplifier; a stabilized direct-current voltage source; an input and an output of said stabilized direct-current voltage source; a comparator; an input and an output of said comparator; said comparator being connected to said demodulator and said output of said stabilized direct-current voltage source; a servomotor; a reduction gear; a direct-current voltage amplifier connected to said output of said comparator and to said servomotor; said servomotor being mechanically coupled via said reduction gear to said output voltage regulator.

* * * * *